United States Patent
Kraschnewski et al.

[15] 3,680,928
[45] Aug. 1, 1972

[54] TREAD BELT DRIVE

[72] Inventors: Melvin W. Kraschnewski, Racine; Erwin F. Stoldt, Cudahy, both of Wis.

[73] Assignee: Bucyrus-Erie Company, South Milwaukee, Wis.

[22] Filed: May 8, 1970

[21] Appl. No.: 35,843

[52] U.S. Cl. ...................................................305/57
[51] Int. Cl. ............................................B62d 55/20
[58] Field of Search......................305/13, 53, 57, 25

[56] References Cited

UNITED STATES PATENTS

| | | | |
|---|---|---|---|
| 1,947,883 | 2/1934 | Snyder | 305/57 |
| 2,483,961 | 10/1949 | Ball | 305/25 |
| 3,486,574 | 12/1969 | Baron | 305/57 |
| 2,727,794 | 12/1955 | Davidson | 305/25 |
| 2,530,379 | 11/1950 | Davidson | 305/25 |
| 1,759,049 | 5/1930 | Fykse | 305/53 X |
| 1,643,598 | 9/1927 | Armstrong | 305/13 X |

*Primary Examiner*—Richard J. Johnson
*Attorney*—Arthur H. Seidel, Allan W. Leiser and Ray G. Olander

[57] ABSTRACT

A tread belt drive for heavy equipment having an endless belt made up of links, each of which has a longitudinally extending tumbler engaging surface across its top that is positioned medially of the link ends, a cog portion with fore and aft facing driving surfaces disposed at each side of the tumbler engaging surface, and cap portions continuing upward from the cog portions that form a guide channel with the tumbler engaging surface. There also is a drive tumbler with teeth that mesh with the link cog portions, and the meshing surfaces of the tumbler teeth and link cog portions have contours and are located in such positions that the forces delivered to the links cause the links to follow around the tumbler circumference without losing mesh.

12 Claims, 9 Drawing Figures

INVENTORS
MELVIN W. KRASCHNEWSKI
ERWIN F. STOLDT

BY Arthur W. Siedel

ATTORNEY

INVENTORS
MELVIN W. KRASCHNEWSKI
ERWIN F. STOLDT

INVENTORS
MELVIN W. KRASCHNEWSKI
ERWIN F. STOLDT

BY Arthur H. Seidel

ATTORNEY

TREAD BELT DRIVE

BACKGROUND OF THE INVENTION

Tread belt drives useful for propelling large excavators and other heavy mobile machinery which are forerunners of the present invention are shown in U. S. Pat. Nos. 2,530,379 and 2,727,794. In these patents the teeth of a rotating driving tumbler engage driving surfaces of tread belt links wrapped about the tumbler to move an endless tread belt along the ground and thereby propel the machinery. The number of links which are driven by the tumbler teeth at any given moment of time is less than the number of links which are wrapped about the tumbler. This manner of driving only some of the links wrapped about the tumbler allows for the wear of parts during normal use, and is achieved by having the pitch angle between tumbler teeth larger than the pitch angle of the links. Each of the pitch angles is measured with the angle apex at the center of the tumbler, and for the measurement of link pitch angle, the angle measured is the arc between the fore and aft pin centers. A discussion of these pitch angles appears in said U.S. Pat. No. 2,727,794, and the mode of operation of this type of tread belt drive differs from that of other links and tumblers in which each link wrapped around the tumbler is engaged by a tumbler tooth. An example of such other type of drive is illustrated in U.S. Pat. No. 3,333,903.

In tread belt drives a link being driven by a tumbler tooth may be forced radially outward of the tumbler in response to the driving forces applied through the tumbler tooth. There is a resultant loss of proper driving engagement between the tumbler tooth and the link, and when the link falls back toward the tumbler an out of mesh condition can occur which results in breakage or damage to the tumbler, the link, or both. The forces involved in operating heavy links for large excavators and the like are very large, and thus when a link strikes a tumbler tooth a fracture of either one or both may occur, and repairs become necessary.

Another problem that can arise is caused by wear of the bearing surfaces of the tumbler and the links which sustain the load of the machine. As wear occurs the links tend to move radially inward toward the tumbler center. The circumferential spacing of the tumbler teeth with respect to the drive surfaces on the links decreases, i.e. the link pitch angle approaches and exceeds the tumbler pitch angle. The necessary driving relation of the tumbler to the links, in which only a few links are engaged at a time, is then lost, and heretofore to remedy such a situation the links must be replaced or a new tumbler installed.

It is against this background of problems in tread belt construction that the present invention has been conceived, and a principal purpose of the invention is to improve upon the type of tread belt drive in which only a few links are in driving relation to a tumbler at any given moment of time.

SUMMARY OF THE INVENTION

The present invention disclosed herein has a link for an endless tread belt which includes a tumbler engaging surface running longitudinally across its top, a cog portion at each side of the tumbler engaging surface for engagement with tumbler teeth, which is disposed at a level lying between the tumbler engaging surface and a bottom ground engaging surface, and fore and aft pin connections with centers at a level beneath the tumbler engaging surface.

In the preferred form of the invention shown herein, the surfaces of the link cog portions that are engaged and driven by the tumbler teeth are positioned within the link body. They are at a level beneath the tumbler engaging surface which sustains vehicle loading, and are quite close to the link bottom and the level of the link pin centers. The teeth of the drive tumbler extend into, or between, the links and have points of driving engagement with the link cog portions that migrate toward the link bottom, as the link turns with the tumbler, so that the driving forces upon the links do not create excessive torques which might otherwise tend to lift the links out of mesh with the tumbler. The lines of action of the driving forces applied to the links by the tumbler teeth pass close to the centers of the link pin connections, and by proper design may even urge a link to slightly follow tumbler rotation as the link breaks contact with the associated tumbler tooth and starts its run to the opposite end of the endless link belt.

It is an object of the invention to deliver driving forces to tread belt links in a manner that the links will remain in proper mesh with the associated drive tumbler, and to overcome prior disadvantages of losing meshing engagement in this type of vehicle drive. Particularly, it is an object to apply driving forces to the individual links at a level close to the link bottom, which level is beneath the load, or tumbler, engaging surface of the link, which construction distinguishes from those in the aforesaid U.S. Pat., Nos. 2,530,379; 2,727,794 and 3,333,903.

Another object is to accommodate for wear of parts that cause an increase in link pitch angle. Such a wear can occur at the pinned connections between links, for such wear tends to increase the length between pin centers as looseness of the pin connections results from the wear. Wear between the drive tumbler and the link surfaces that ride over the tumbler can also effect an increase in link pitch angle. This is because the link moves closer to the tumbler center, and thereby increases the angle measured between pin centers with the tumbler center as the angle apex. To overcome this last form of wear, the invention contemplates the provision of a tumbler that has a wear surface in the form of a circular rim. This surface rides on the tread belt links, and after wear reduces the rim diameter a hoop can be placed around the rim to reestablish the desired diameter. The links are then moved radially outward to regain the desired relation between tumbler and link pitch angles.

The aforesaid wear that occurs between the link pins and the link openings that receive the pins is largely accommodated by the type of link-tumbler engagement in which only a few links are engaged at a time by tumbler teeth, all as described in said U.S. Pat. No. 2,727,794. Thus, advantages of the former construction shown in such patent are retained together with improvements of the present invention.

Further objects include provision of a tread belt link of relatively simple geometry that can be readily produced, increased life for tread belt links and the tumblers that drive them, and greater reliability in the use of tread belts for large excavating machinery.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in many different embodiments, and reference is made to the claims herein for interpreting the breadth of the invention.

BRIEF DESCRIPTION OF THE DRAWINGS

FIG. 7 is a view of a drive tumbler embodying a portion of the invention with parts broken away and in section to reveal the interior thereof.

DESCRIPTION OF THE PREFERRED EMBODIMENT

Figure 8:
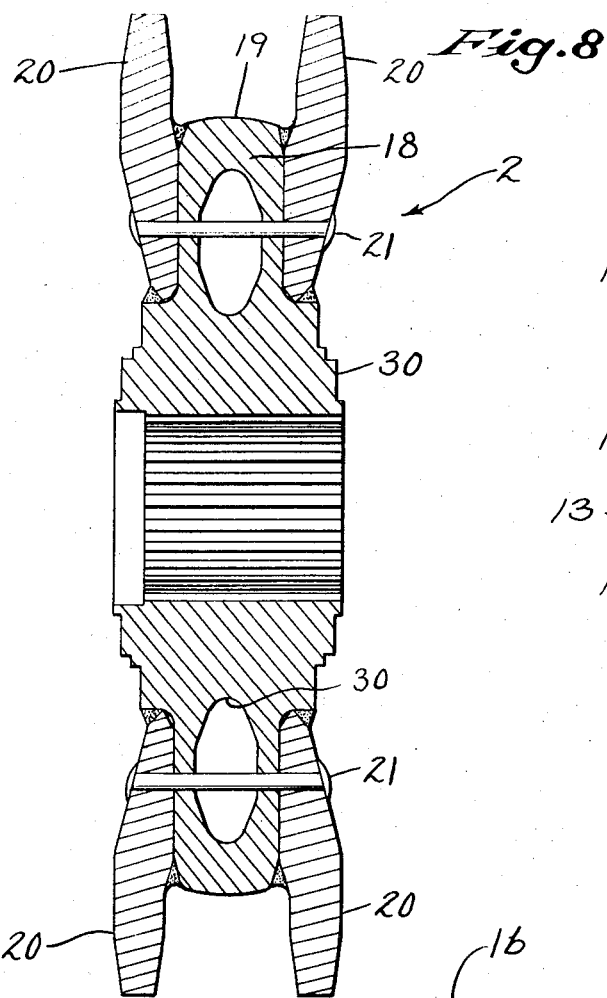
FIG. 8 is a view in cross section of the drive tumbler of FIG. 7 taken on the plane 8—8.

A tread belt link 1 is shown in the drawings that is useful for heavy mobile machinery such as quarry excavators. A number of such links are attached to one another to form an endless, ground engaging tread belt, and such a tread belt is disposed on each side of a machine for propelling it along the ground. The endless tread belts pass over rollers that support the machine proper, and to drive the tread belt each is in mesh with a drive tumbler 2, as shown in FIGS. 7 and 8, that is located at one end of the belt. For the purpose of describing the links and tumbler shown in the drawings the direction of travel of the links will be called "longitudinal," and the direction from one side, or end, of a link to the other side, or end, will be called "transverse." Referring to FIG. 1, the longitudinal direction of the link 1 is vertical with respect to the lengthwise direction of the drawing sheet, and the transverse direction runs across the narrow dimension of the drawing sheet. To further facilitate description of the subject matter, the ground engaging surface 3 of a link 1 will be termed the "bottom" of the link, and the direction through the link from the ground engaging surface 3 will be termed "upward," even though links in the upper run of an endless tread belt are oriented so that such upward direction will, in the total assembly, point downwardly toward the ground.

The link 1 shown in the drawings has an upwardly facing, flat tumbler engaging surface 4 that extends longitudinally across the top of the link 1. This surface 4 is located medially of the two ends of the link 1, and extends for the full length of the link from a front face 5 to a rearward extension beyond an after face 6. The rearward extension of the tumbler engaging surface 4 is a part of a tongue 7 that extends vertically the full depth of the link 1 between the ground engaging surface 3 and the surface 4. Thus, when two links 1 are attached to one another as a part of an endless tread belt, the tumbler engaging surfaces 4 present a nearly continuous surface for engagement with a drive tumbler 2 and other rolls over which the links pass.

Figure 3:
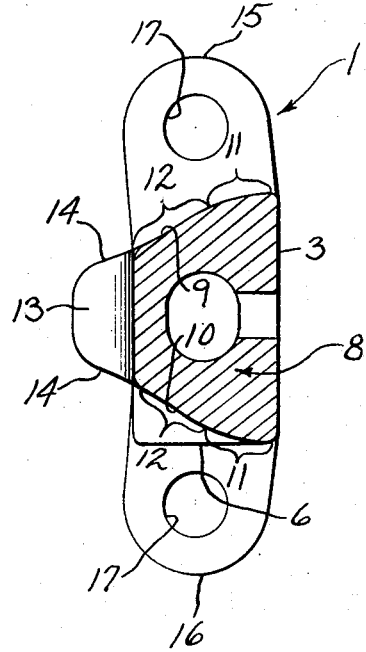
FIG. 3 is a view in cross section of the tread belt link of FIG. 1 taken on the plane 3—3.
Figure 4:
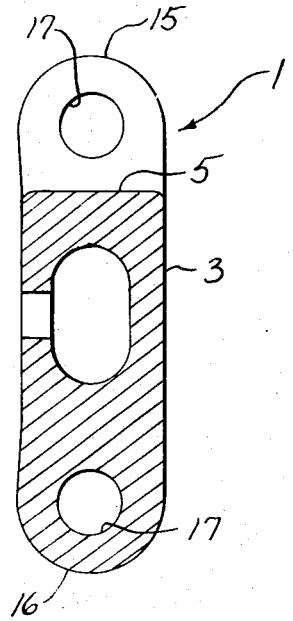
FIG. 4 is a view in cross section of the tread belt link of FIG. 1 taken on the plane 4—4.
Figure 1:
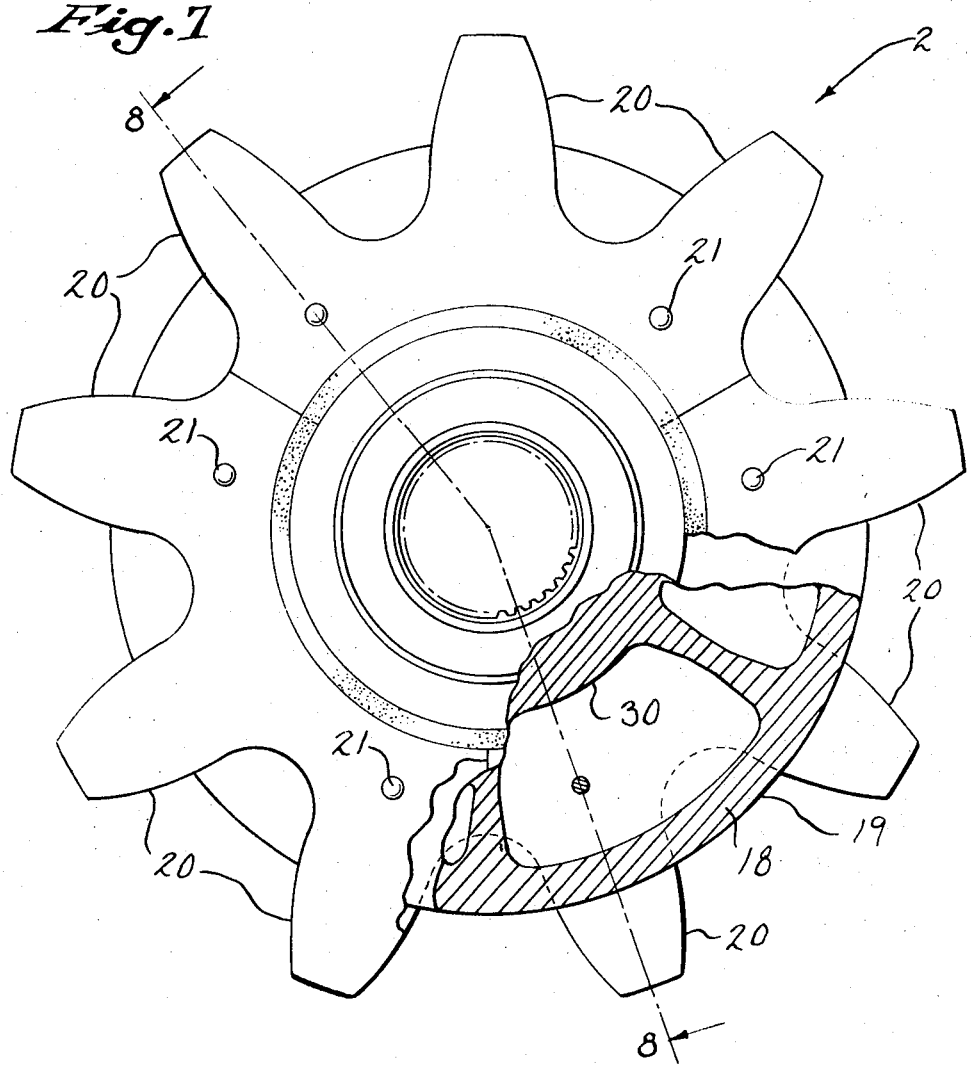

Immediately adjacent each side of the tumbler engaging surface 4 is a cog portion 8, and reference is made to FIG. 3 for a view in cross section of such a portion 8. Each cog portion 8 is an integral part of the link that commences at the ground engaging surface 3 and extends upward to an elevation coincident with that of the tumbler engaging surface 4. Each cog portion 8 has its greatest longitudinal length at the bottom of the link 1 and it tapers in an upward direction. The taper is comprised of fore and aft driving surfaces 9 and 10 that face respectively to the front and rear of the link 1. The driving surfaces 9 and 10 are of like configuration, with a convex region 11 rising upwardly from the ground engaging surface 3 that merges into a concave region 12 that continues up to the level of the tumbler engaging surface 4.

Figure 6:
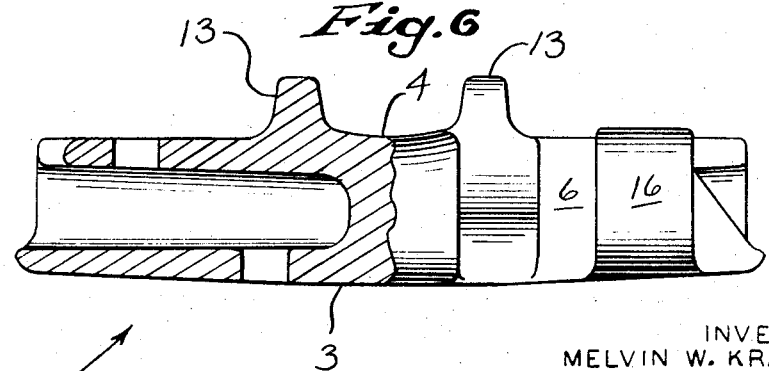
FIG. 6 is a transverse view of the tread belt link of FIG. 1 with parts broken away and in section so as to have a portion thereof viewed through the plane 6—6 indicated in FIG. 1.
Figure 5:
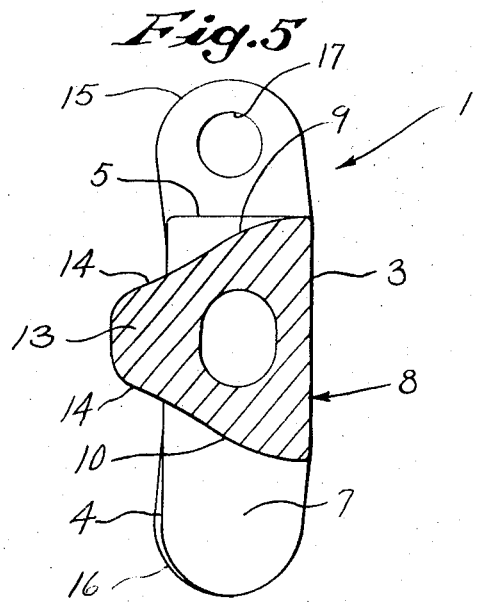
FIG. 5 is a view in cross section of the tread belt link of FIG. 1 taken on the plane 5—5.

Extending upward, as an integral continuation of each cog portion 8, is a cap 13 that extends above the elevation of the tumbler engaging surface 4. The fore and aft surfaces 14 of each cap 13 continue the upward concave tapers of the drive surface regions 12 of the associated cog portion 8, so that the longitudinal dimension of each cap 13 is less than that of the cog portion 8 from which it extends. As seen in FIG. 6, the caps 13 form with the tumbler engaging surface 4 a channel-like configuration, as viewed from the front or rear of the link 1, to provide guiding for engagement with the drive tumbler 2 and other rollers which the links of an endless tread belt ride across as the machine carried on the tread belt is propelled along the earth.

Figure 1:
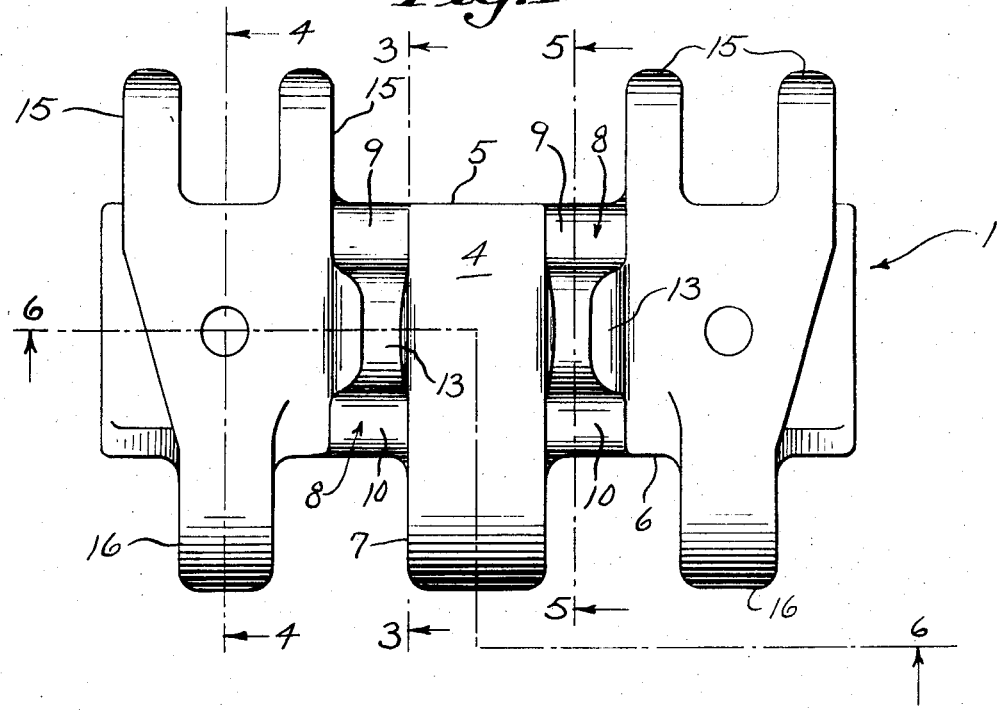
FIG. 1 is a plan view of a tread belt link embodying the present invention.
Figure 2:
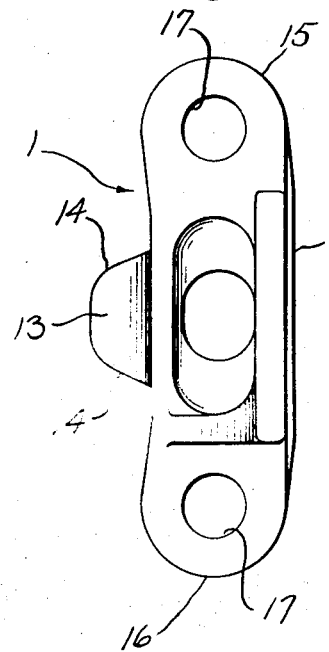
FIG. 2 is an end view of the tread belt link of FIG. 1.

As particularly seen in FIG. 1, there is a set of four connecting ears 15 that extend forward of the front face 5, with one pair of ears 15 being outboard, or to the side, of one of the cog portions 8, and the other pair of connecting ears 15 being to the opposite side, or outboard, of the other cog portion 8. There is also a second set of connecting ears 16 which extend to the rear of the afterface 6, with one ear 16 being outboard of one cog portion 8 and the other ear 16 being outboard to the opposite side of the other cog portion 8. As shown in FIGS. 2–5, the connecting ears 15, 16 are provided with pin openings 17 that have their centers approximately medial in height between the ground engaging surface 3 and the tumbler engaging surface 4. To connect links 1 to one another the connecting ears 16 of one link are interdigitated with the connecting ears 15 of the succeeding link, and appropriate pins are driven into the openings 17 to join the links 1 to one another. In this fashion a continuous, endless tread belt is developed.

Referring now to the drive tumbler 2 shown in FIGS. 7 and 8, there is a central mounting hub 30 that merges into and supports a rim 18. The rim 18 extends continuously around the hub 30 and presents a radially outward facing rolling surface 19, and it is this surface 19 that will roll along and bear upon the tumbler engaging surfaces 4 of the links 1. Mounted on each side of the rim 18 is a plurality of driving teeth 20, that are spaced circumferentially from one another to form a gear wheel.

As shown in FIG. 7, the driving teeth 20 are formed in sets of three, and each set of three is mounted along the side of the rim 18 and held in place by a pin 21 and appropriate welding, all as shown in FIG. 8. Thus, as the teeth 20 wear, or otherwise need replacement, the sets can be readily removed and replaced, thereby extending the life of a drive tumbler 2. A further aspect of the tumbler 2 is that as the rolling surface 19 wears from its engagement with the links 1 a band can be placed around the surface 19 and welded in place, so as to increase the tumbler diameter, thereby adding to the life and utility of the tumbler 2.

Figure 9:
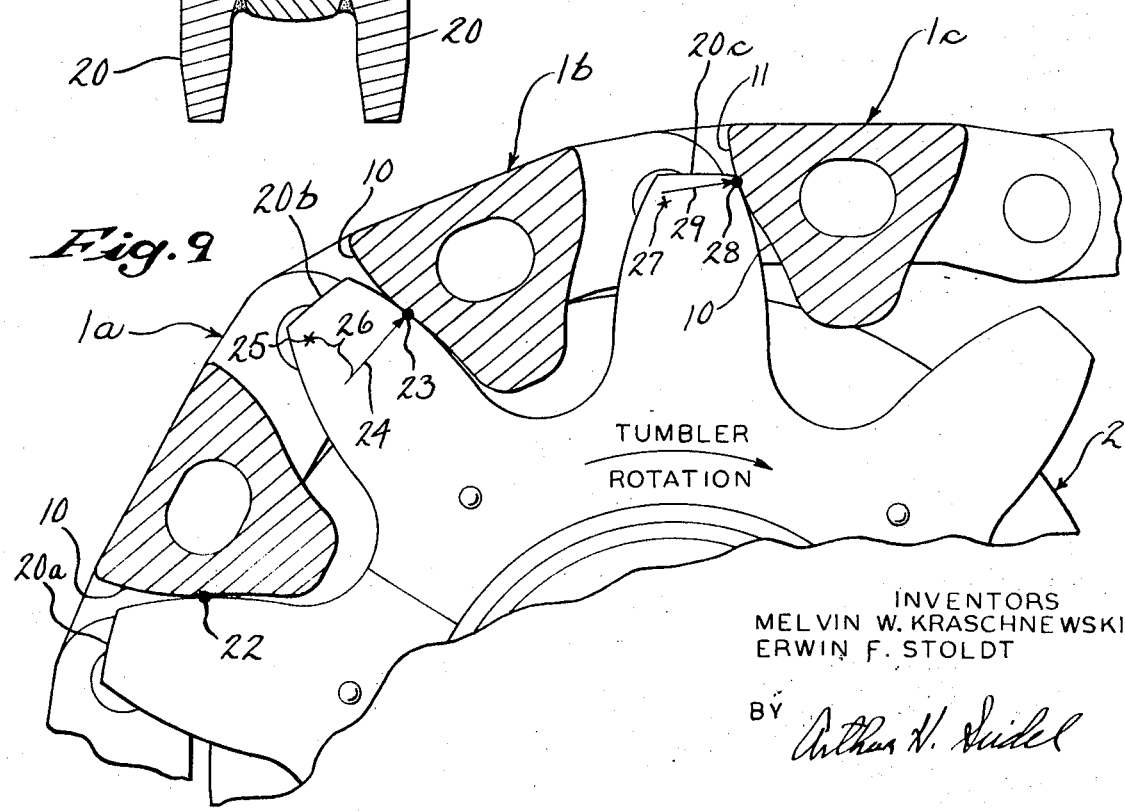
FIG. 9 is a fragmentary view of an assembly comprising the drive tumbler of FIGS. 7 and 8, and a number of tread belt links of FIGS. 1 through 6.

Referring now to FIG. 9, there is shown a fragmentary portion of the drive tumbler 2 in assembly with a set of links 1, and the unique manner of engagement of the tumbler teeth 20 with the driving surfaces 10 of the links 1 is depicted. In the present invention, only some of the driving teeth 20 of the tumbler 2 are in engagement with the link driving surfaces 10 at any given instant of time. This is the type of engagement shown and described in said U.S. Pat. No. 2,727,794, as hereinbefore discussed, and in FIG. 9 there is shown those particular teeth that are in engagement with the links 1 when the tumbler 2 is moving in a clockwise direction, as indicated. For purposes of discussion, the three links 1 in FIG. 9 have been designated 1a, 1b and 1c, and the tumbler teeth 20 that are in mesh therewith have been designated 20a, 20b and 20c. The tumbler tooth 20a is about to engage the driving surface 10 of the link 1a, and such initial engagement will occur at about the point 22. When such engagement occurs the link 1a will be forceably moved and carried along with the rotation of the tumbler 2, whereby such link 1a will exert a pull upon the succeeding links that are trailing therebehind.

A driving contact between tooth and cog surfaces is illustrated in FIG. 9 by the engagement of the tooth 20b and the link 1b. These members are in engagement such that the point 23 is the effective driving point, and the force exerted by the tooth 20b upon the link 1b is illustrated by the arrow 24. This point of application of force is well beneath the associated tumbler engaging surface 4, so that the torque exerted upon the link 1b about its pin center 25 has a short radius arm 26. As a result, the torque tending to lift the link 1b out of engagement with the tumbler 2 is not sufficient to overcome the pull force exerted by the link 1c upon the pin center 27. As a result, the link 1b will remain in proper mesh with the tumbler 2.

Link 1c is in engagement with the tooth 20c at the point 28, which is just prior to the link 1c losing contact with the tumbler tooth. The line of force at the point 28 is designated by the arrow 29, and it is readily seen that such force may pass radially to the outside of the pin center 27, so as to develop a slight torque upon the link 1c which tends to turn the link toward the ground, so as to slightly urge it to continue to travel about the tumbler 2. At this point of engagement between link 1c and tooth 20c the tooth 20c is driving against the convex portion 11 of the link driving surface 10, and by proper proportioning of the convex surface 11 the line of application of the force driving the link 1c, as represented by the arrow 29, may be designed to obtain a desired link action. For example, the force of the arrow 29 may be directed more tangential to the tumbler 2, so as to cause the tooth 1c to dip around with the tumbler 2 before it leaves the tumbler 2 and initiates its flight along the endless belt toward the opposite end of the belt. Or, conversely, the line of force represented by the arrow 29 might be given a slightly different angle which will cause the tooth 1c to move slightly radially outward, to disengage more promptly from the tumbler 2. In any event, the tooth 1c has a force directed thereon which overcomes the difficulty of prior art devices, in which the driving force upon the links causes the same to move radially outward with respect to the tumbler, so as to lose the engagement necessary for satisfactory operation.

It is apparent from FIG. 9 that the point of engagement 23 is, with respect to the tumbler 2, radially outside the point 22. Similarly, the point 28 is radially outside the point 23. Thus, the point of engagement between a tumbler tooth 20 and the driving surface 10 of the associated link 1 moves radially outward with respect to the tooth 20, or conversely, downward along the link driving surface 10. To obtain a smooth mesh between the links 1 and the tumbler 2 the curvature of the surface of the teeth 20 may take a contour of normal gear tooth design, and the concave regions 12 of the driving surfaces 10 then take an appropriate mating contour.

The satisfactory operation of the invention is obtained largely from disposing the driving surfaces 9, 10 downwardly beneath the tumbler engaging surface 4, so that the line of direction of driving forces upon the links have small moment arms about the connecting pin centers. As a result the links links will not move out of mesh, and a better driving engagement is obtained. The improved force relationship between tumbler teeth 20 and link cog portions 8 is also had when the direction of rotation of the tumbler 2 is reversed, for the purpose of propelling the main machinery in the opposite direction. Then, the tumbler teeth 20 drive against the cog surfaces 9, and the tooth engagement occurs near the bottom of the tumbler 2 instead of the top, as in FIG. 9. Because of the presence of the earth the advantages of the invention may not be as important, but they nevertheless may be realized.

The invention also provides a tread belt link that may be of husky construction necessary for transportation of very large and heavy equipment, such as excavators used in quarries and drag line machines that are used in a variety of other earth moving operations. For each link 1 a pair of cog portions 8 are provided, so that for each link there is a pair of driving surfaces, either 9 or 10 depending upon direction of machine travel, for engagement with a pair of tumbler teeth 20 mounted at opposite sides of the tumbler rim 18. This distinguishes from single tooth engagement, as exemplified in patents such as said U.S. Pat. No. 3,333,903.

Further, the areas of engagement along both the surfaces of the teeth 20 and the driving surfaces 9 and 10 of the links 1 are substantial. As has been pointed out in reference to FIG. 9, the point of engagement 22 for the tooth 20a is radially closer to the tumbler center than the point of engagement 28 for the tooth 20c, so that the point of engagement moves outward along the tumbler tooth 20 as the tumbler progresses in its rotation. As a result, the wear surfaces on both the links 1 and the tumbler 2 are quite large, and the life of the parts is improved over constructions in which the points of engagement remain fixed.

We claim:

1. In a tread belt link the combination of:
   a bottom surface;
   an upwardly facing tumbler engaging surface extending longitudinally across the top of the link which is positioned medially of the link ends;
   a cog portion that is an integral part of the link disposed adjacent said tumbler engaging surface, such cog portion tapering upward from the bottom surface toward the tumbler engaging surface with its greatest longitudinal length at the link bottom and having a driving surface forming the taper that faces in a longitudinal direction and that extends downward, beneath said tumbler engaging surface to a level near the link bottom; and
   connecting ears offset transversely from the cog portion and extending fore and aft of the link for connection with successive links that make up a complete tread belt, said ears having connection pin openings with centers located beneath said tumbler engaging surface.

2. A tread belt link as in claim 1 having a contour for the driving surface of the cog portion that is concave in its upper portion and which becomes convex in its lower portion.

3. In a tread belt link the combination of:
   a ground engaging bottom surface;
   a pair of laterally spaced cog portions that are integral parts of the link, each cog portion having:
      fore and aft driving surfaces that face, respectively, to the front and rear of the link, each driving surface extending upward from the link bottom with a convex contour and then reversing to a concave contour, such fore and aft driving surfaces of a cog being upwardly convergent with respect to one another; and
   connecting ears extending fore and aft of the link which have connection pin openings with centers located at a level that is in alignment with said driving surfaces.

4. In a tread belt link the combination of:
   a ground engaging bottom surface;
   an upwardly facing tumbler engaging surface extending longitudinally across the top of the link which is positioned medially of the link ends;
   a pair of cog portions that are integral parts of the link disposed with one cog portion on each side of the tumbler engaging surface, each cog portion having:
      fore and aft driving surfaces that face, respectively, to the front and rear of the link which are upwardly convergent with respect to one another;
   a cap portion extending upward from each cog portion to a height above said tumbler engaging surface to form a guide channel with the tumbler engaging surface;
   a first set of connecting ears arranged transversely across the front of the link;
   a second set of connecting ears arranged transversely across the rear of the link; and
   said ears being transversely spaced such that those along the front will interdigit with those along the rear of an adjacent link, and said ears having connection pin openings with centers located at a level beneath said tumbler engaging surface.

5. A tread belt link as in claim 4 wherein said connection pin openings have their centers substantially mid-way between said bottom and tumbler engaging surfaces.

6. A tread belt link as in claim 4 wherein said fore and aft driving surfaces have a concave portion along the upper part thereof.

7. In a tread belt link the combination of:
   a ground engaging bottom surface;
   an upwardly facing tumbler engaging surface extending longitudinally across the top of the link which is positioned medially of the link ends;
   a pair of cog portions that are integral parts of the link disposed with one cog portion on each side of the tumbler engaging surface, each cog portion having:
      fore and aft driving surfaces that face, respectively, to the front and rear of the link, each driving surface extending upward from the link bottom with a convex contour and then reversing to a concave contour that extends substantially to the level of said tumbler engaging surface, such fore and aft driving surfaces of each cog being upwardly convergent with respect to one another;
   a cap portion extending upward from each cog portion to a height above said tumbler engaging surface to form a guide channel with the tumbler engaging surface, the longitudinal dimension of each cap portion being less than that of the cog portion from which it upstands;
   a first set of connecting ears arranged transversely across the front of the link, some of such ears being outboard to one side of one cog portion, and some being outboard to the opposite side of the other cog portion;
   a second set of connecting ears arranged transversely across the rear of the link, some of such ears being outboard to one side of one cog portion, and some being outboard to the opposite side of the other cog portion; and
   said ears being transversely spaced such that those along the front will interdigit with those along the rear of an adjacent link, and said ears having connection pin openings with centers located substantially mid-way between said bottom and tumbler engaging surfaces.

8. A tread belt link as in claim 7 in combination with a drive tumbler having a mounting hub; a rim supported from said hub with a radially outward facing rolling surface that engages said tumbler engaging surface; and a set of driving teeth circumferentially spaced around each side of said rim that extend radially outward of the rim to protrude into and engage the cog portions of the tread belt link.

9. In a tread belt drive the combination of:
   a set of tread belt links each having:

a ground engaging bottom surface;

an upwardly facing tumbler engaging surface extending longitudinally across the top of the link which is positioned medially of the link ends;

a pair of cog portions that are integral parts of the link disposed with one cog portion on each side of the tumbler engaging surface, each cog portion having:

fore and aft driving surfaces that face, respectively, to the front and rear of the link which are upwardly convergent with respect to one another;

a cap portion extending upward from each cog portion to a height above said tumbler engaging surface to form a guide channel with the tumbler engaging surface;

a first set of connecting ears arranged transversely across the front of the link;

a second set of connecting ears arranged transversely across the rear of the link; and said ears being transversely spaced such that those along the front will interdigit with those along the rear of an adjacent link, and said ears having connection pin openings with centers located at a level beneath said tumbler engaging surface; and a drive tumbler having:

a mounting hub;

a rim supported from said hub with a radially outward facing rolling surface that engages said tumbler engaging surfaces; and a set of driving teeth circumferentially spaced around each side of said rim that extend radially outward of the rim to protrude into and engage the cog portions of the tread belt links.

10. A tread belt drive as in claim 9 with said driving teeth of said tumbler having convex surfaces, and said fore and aft driving surfaces of said cog portions having convex surfaces for engagement by said teeth.

11. In a tread belt link the combination of:

a ground engaging bottom surface;

an upwardly facing tumbler engaging surface disposed above the bottom surface for supporting contact with a tumbler;

a first set of connecting ears arranged transversely across the front of the link;

a second set of connecting ears arranged transversely across the rear of the link which interdigit with ears of an adjacent link;

said first and second sets of ears having connection openings disposed at a height between the ground engaging and tumbler engaging surfaces; and a cog portion transversely offset from the ears of said first and second sets which extends longitudinally from the front to the rear and tapers upward from the ground engaging bottom surface toward the tumbler engaging surface to present a fore driving surface that faces to the front and an aft driving surface that faces to the rear.

12. A tread belt link as in claim 11, wherein the contour of the taper of the cog portion is defined by the fore and aft driving surfaces, and such surfaces provide for a point of engagement with a sprocket tooth that shifts toward the link bottom surface as the link moves about a sprocket.

* * * * *